(12) United States Patent
Amidei (10) Patent No.: US 6,176,566 B1
(45) Date of Patent: *Jan. 23, 2001

(54) CELL-BASED TEXT ENHANCEMENT FOR A COLOR PRINTER BY COMPLETE EXCESS-COLOR STRIPPING, BASED ON PREVIOUS REGIONS

(75) Inventor: James S. Amidei, San Diego, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/814,494

(22) Filed: Mar. 10, 1997

(51) Int. Cl.[7] ............... B41J 2/21; B41J 29/393; H04N 1/40
(52) U.S. Cl. ................... 347/43; 347/19; 358/448
(58) Field of Search ................ 347/43, 74, 15, 347/19; 395/117, 109, 134; 358/298, 447, 448, 462

(56) References Cited

U.S. PATENT DOCUMENTS

| | | |
|---|---|---|
| 5,047,844 | 9/1991 | Ikeda et al. . |
| 5,206,719 | 4/1993 | Ikeda et al. . |
| 5,477,335 | 12/1995 | Tai . |
| 5,483,625 * | 1/1996 | Robertson et al. ........... 395/117 |
| 5,519,815 * | 5/1996 | Klassen .................. 395/109 |
| 5,563,985 * | 10/1996 | Klassen et al. ............ 395/109 |
| 5,574,832 * | 11/1996 | Towery et al. ............. 395/109 |
| 5,642,474 * | 6/1997 | Parkhurst et al. .......... 395/117 |
| 5,848,225 * | 12/1998 | Nickell et al. ............ 395/109 |

* cited by examiner

Primary Examiner—Thinh Nguyen (57) ABSTRACT

An image that includes black-and-white text—from which most chromatic-colorant data in text areas have already been stripped—is enhanced by removing all chromatic-colorant data from a region of the image data array, independent of object type. Removal occurs only if color-data conditions are met; the data array is then applied to print the image. The system includes storage and automatic retrieval of instructions for automatically evaluating the condition, removing chromatic-colorant data, and applying the color-stripped data in printing. The conditions include whether the amount of chromatic-colorant data in (A) the region is less than a certain threshold; (B) an entire row immediately above the region is less than a second threshold; (C) a region adjacent to the region is less than a third threshold; and (D) a vertical column above the particular region exceeds a fourth threshold. In this last case the system counts a number of consecutive regions, vertically above the region, from which chromatic-colorant data have been removed; and then refrains from removing chromatic-colorant data from the region if the count exceeds the fourth threshold. The system thus limits the effect of the first three conditions, to deter chromatic-colorant removal from a substantially continuous thin vertical chromatic-color line. The four thresholds are disclosed and explained.

22 Claims, 2 Drawing Sheets

CELL-BASED TEXT ENHANCEMENT FOR A COLOR PRINTER BY COMPLETE EXCESS-COLOR STRIPPING, BASED ON PREVIOUS REGIONS

RELATED PATENT DOCUMENTS

A related document is another, coowned U. S. utility-patent application filed in the United States Patent and Trademark Office on May 10, 1996—and hereby incorporated by reference in its entirety into this document. It is in the name of Jae J. Noh, and identified as Hewlett Packard Company docket number 10950653D1H54, and entitled "PRINTING WITH TEXT ENHANCEMENT: RECOGNITION BY SENSING PAIRED EDGES, OR BY DISQUALIFICATION IN PICTORIAL REGIONS"—and subsequently assigned utility-patent application Ser. No. 08/644,808, and issued as U.S. Pat. No. 5,946,420 on Aug. 31, 1999.

FIELD OF THE INVENTION

This invention relates generally to machines and procedures for printing color images that include black-and-white text (or other purely black-and-white matter), together with other matter such as graphics in color, on a printing medium; and more particularly to such a machine and method that construct text or images from individual ink spots created on a printing medium, in a two-dimensional pixel array. The invention, although preferably practiced in conjunction with scanning-inkjet technology, has useful application with other colorant-applying mechanisms and methods.

BACKGROUND OF THE INVENTION (a) Color fringing and other sources of excess color in black-and-white image elements—In the copying of color documents that contain black-and-white material such as text, a color fringe commonly appears in the transitions between black and white, at each edge (or at least many edges) within that monochrome material. "Color fringe" here means chromatic color that was not present in an original, and that usually is introduced into an image by tiny misalignments of the red, green and blue additive-primary detection systems in a scanning stage.

(b) Throughput problems, and perception—It is undesirable to leave this color fringe, or what may be called "excess color", in the image data. Because of the way most color printers work, black-and-white text with even the smallest amount of color cannot be printed as quickly as the same text which contains absolutely no color. A very significant difference in printing speed results.

It is helpful to understand that the problem addressed here is not one of visual or esthetic defect. Usually the color fringe is only on the order of one or a very few pixels, which the unaided human eye ordinarily cannot readily resolve—at least not in the presence of an intimately associated high-contrast transition, namely the black-white transition which generated the fringe.

Thus the problem is purely one of printing throughput (e.g., pages per unit time). When pure black-and-white material is to be printed, a system can use exclusively black colorant and just a single pass.

Even one color dot in a line of black-and-white text, however, is enough to greatly impact the printing process. It requires the system to print in multiple, overlapping passes—and using printheads that dispense chromatic colorant.

If black-and-white matter has been previously detected, the printer could be simply instructed to ignore the color dots. This, however, would form a major disruption of the printing protocols in the system. A faster and simpler cure is desired.

Analogously, the scanner cannot simply be set to monochrome, for the black-and-white material as indicated above is embedded within a color image. A user could be required to point out the black-and-white material to the system in advance, but preferably operation in this regard should be entirely automatic.

(c) Related efforts to resolve the problem—It is known in commercial products to establish a subsystem that watches for certain kinds of objects, black-and-white text in particular, and upon identifying such an object removes associated chromatic-color data. Text may be identified in various ways, as for example in the previously mentioned application of Noh.

Subsystems for identifying and then removing excess color take a variety of forms, and in fact remove very nearly all the color—but unfortunately all are imperfect in end result. Such failure to remove all color often arises from interaction between some minor feature in text and a detecting protocol of the subsystem.

For instance, underscoring—or other shallow or small structures, or spatially extended structures—diverge from the characteristics of text characters that are commonly employed in text recognition. They thereby confuse the recognition protocols.

Another problem that can complicate the issues is the desirability of looking at nearby associated areas of the image to determine whether a particular region of interest is likely to be black-and-white text. Such examination when performed in immediate conjunction with text recognition becomes unduly complex.

Furthermore, sometimes removing excess color in a region—on the basis that that area and also nearby areas seem to contain text—can be counterproductive. Such tests have a tendency to logically interconnect areas in which standard decisional protocols may be wrong, and so may result in propagating incorrect decisions. This type of error can result in removing macroscopic chromatic-color features that are significant in the image—making untrue the suggestion earlier in this document that fringing does not produce perceptible image defects.

(d) Conclusion—Color fringing, and resultant low throughput in black-and-white text regions, have continued to impede achievement of uniformly excellent inkjet printing—at high throughput—on all industrially important printing media. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is color printing apparatus for printing a desired image that includes black-and-white text, by construction from individual marks formed in pixel column-and-row arrays. The apparatus performs this printing in a desired-image data array from which most chromatic-colorant data in text areas have already been stripped.

The apparatus includes some means for receiving such a data array. For purposes of generality and breadth in describing and discussing the invention, these means will be called simply the "receiving means".

In addition the apparatus includes some means for removing all chromatic-colorant data from a particular region of the array, if specified color-data conditions for the particular region are satisfied. The basis of this removal is independent of object type within the region. These means, again for breadth and generality, I shall call the "removing means".

The apparatus also includes some means for applying the data array, after removal of all chromatic-colorant data from the particular region, to control printing of the image by a color printer. These means, analogously to the first two introduced, will be called the "applying means".

The foregoing may constitute a description or definition of the first facet of the invention in its broadest or most general form. Even in this general form, however, it can be seen that this aspect of the invention significantly mitigates the difficulties left unresolved in the art.

In particular, the apparatus of this facet of the invention can scour out the relatively few remaining pixels of chromatic-colorant data left by a text-recognition system within the same apparatus—or in an upstream module such as may be found in a printer driver or self-standing image-processing application. It does the same for any other preceding system that is designed to identify areas which should be printed in black and white, for one reason or another, within a color image—but that tends to leave just a very small residual of chromatic-colorant data.

The apparatus thereby actually achieves the objective of printing black-and-white text (or other black-and-white portions) in a monochrome mode—despite the fact that the text is found embedded in a color image that is being printed on a color printer, and generally in color. Furthermore the apparatus also performs a task that cannot be performed well by a chromatic-color stripping module operating without prior partial stripping based, for instance, on object recognition, since such a module is not readily instructed how to avoid stripping out color from objects that should print in color.

Although this aspect of the invention in its broad form thus represents a significant advance in the art, it is preferably practiced in conjunction with certain other features or characteristics that further enhance enjoyment of overall benefits.

For example, it is preferred that the apparatus also include some means for storage, and automatic retrieval therefrom, of instructions for automatic operation of the receiving, removing and applying means.

Another preference is that the removing means include some means for determining whether the amount of chromatic-colorant data in the particular region is less than a specific threshold. In this case the apparatus also includes some means, responsive to the determining means, for then removing chromatic-colorant data from the particular region.

It is further preferable that the removing means also include some means for ascertaining whether the amount of chromatic-colorant data in an entire row immediately above the particular region is less than a second specific threshold. In this case the responsive means are also responsive to the ascertaining means.

Moreover I prefer that the removing means additionally include some means for testing whether the amount of chromatic-colorant data in a region adjacent to the particular region is less than a third specific threshold. In this case the responsive means are also responsive to the testing means—and preferably the adjacent region is immediately above the particular region, generally the same width as the particular region.

Another preference is that the removing means in addition include some means for assessing whether the amount of chromatic-colorant data in a vertical column above the particular region exceeds a fourth specific threshold. In this case the responsive means are also responsive to the assessing means.

In this situation the assessing means include some means for counting a number of consecutive regions, vertically above the particular region, from which chromatic-colorant data have been removed. The responsive means then refrain from removing chromatic-colorant data from the particular region if the number of consecutive regions exceeds the fourth specific threshold.

The number of consecutive regions is thus serving as a measure of the previously mentioned amount of chromatic-colorant data in the vertical column. In this way the assessing means operate to limit the effect of the deters mining, ascertaining and testing means, to deter chromatic-colorant removal from a substantially continuous thin vertical chromatic-color line.

With respect to this monitoring of data in a vertical column, preferably the threshold is set as follows. Considered with respect to all color planes, the threshold is a number of regions corresponding to a printed column of the image between about $\frac{1}{64}$ mm ($\frac{1}{1600}$ inch) and $\frac{1}{6}$ mm ($\frac{1}{16}$ inch) inclusive. The threshold is independent of the amount of black-colorant data present.

In preferred embodiments of a second of its aspects, the invention is color printing apparatus for printing a desired image that includes black-and-white text, by construction from individual marks formed in pixel column-and-row arrays. The apparatus includes some means for receiving or generating a data array corresponding to a desired image—and I shall call these means the "receiving-or-generating means".

Also included are some automatic means for analyzing the image data by subdividing it into regions and determining whether the amount of chromatic-colorant data, independent of object type, in a particular region is less than a specific threshold. These means will be called the "analyzing-and-determining means".

The apparatus also includes some means, responsive to the analyzing-and-determining means, for then removing chromatic-colorant data from the particular region. In addition it includes some means for applying the data array, after removal of chromatic-colorant data from the region, to control printing of the image by a color printer.

The foregoing may constitute a description or definition of the second facet of the invention in its broadest or most general form. Even in this general form, however, it can be seen that this aspect of the invention too significantly mitigates the difficulties left unresolved in the art.

In particular, this aspect of the invention makes it possible to avoid printing black-and-white text or a like region in an image more slowly than necessary, based simply upon the amount of chromatic-colorant data present in that same region—and without testing for object type.

Although this second aspect of the invention in its broad form thus represents a significant advance in the art, it is preferably practiced in conjunction with certain other features or characteristics that further enhance enjoyment of overall benefits.

For example, it is preferred that the threshold be a total, considering each color plane independently, of between about four percent and fifty percent, inclusive, of the region size, independent of the amount of black-colorant data present. The basis for this preference will be discussed in the later "DETAILED DESCRIPTION" section of this document. An ideal value, for a preferred embodiment of this aspect of the invention, is fifty out of a possible 128 pixels, or about thirty-nine percent.

In a third basic aspect or facet, the invention is color printing apparatus for printing a desired image that includes black-and-white text, by construction from individual marks formed in pixel column-and-row arrays. The apparatus includes receiving-or-generating means generally as described above for the second aspect of the invention.

It also includes some automatic means for analyzing the image data by subdividing it into regions and ascertaining whether the amount of chromatic-colorant data, independent of object type, in exactly one entire row immediately above a particular region is less than a specific threshold. These will be called the "analyzing-and-ascertaining means".

Further included are some means, responsive to the ascertaining-and-ascertaining means, for then removing chromatic-colorant data from the particular region. In this third of its aspects, the invention also includes some means for applying the data array, after removal of chromatic-colorant data from the region, to control printing of the image by a color printer.

This third facet of the invention thus is beneficial in that it enables taking into account certain selected nearby image regions, in deciding whether to strip out color data—but again without testing the object type. Nevertheless preferably certain other features are incorporated for best results.

In particular, preferably the threshold is a total, for all color planes, of between one mark per row and about three percent of the row size per row, inclusive, independent of the amount of black-colorant data present.

An ideal value for a preferred embodiment of the invention is six marks, which—spread over a single previous row of 2400 pixels and three color planes—is $6/(2400 \cdot 3)=0.08\%$ of the row size per row, and of course is greater than one mark.

In preferred embodiments of a fourth of its aspects, the invention is color printing apparatus for printing a desired image that includes black-and-white text, by construction from individual marks formed in pixel column-and-row arrays. The apparatus includes receiving-or-generating means as before.

It also includes some automatic means for analyzing the image data by subdividing it into regions and testing whether the amount of chromatic-colorant data in a region adjacent to a particular region is less than a specific threshold. These means will be called the "analyzing-and-testing means".

Also included are some means, responsive to the analyzing-and-testing means, for then removing chromatic-colorant data from the particular region. The apparatus also includes some means for applying the data array, after removal of chromatic-colorant data from the region, to control printing of the image by a color printer.

This fourth aspect of the invention has benefits analogous to those indicated above for the third, but the region tested is different and has somewhat different implications. Preferably the adjacent region is immediately above the particular region, and generally the same width as the particular region.

In this case I prefer a threshold, for all the color planes considered together, between one mark and about fifty percent of the region size, inclusive, independent of the amount of black-colorant data present. Here the removing means remove chromatic-colorant data from each color plane in which the threshold is not exceeded.

As to preferred embodiments of a fifth of its aspects, the invention is color printing apparatus for printing a desired image that includes black-and-white text, by construction from individual marks formed in pixel column-and-row arrays. It includes receiving-or-generating means as above.

Also included are some automatic means for analyzing the image data by subdividing it into regions and assessing whether the amount of chromatic-colorant data in a column of regions vertically above a particular region is less than a specific threshold. These will be called the "analyzing-and-assessing means". The analyzing-and-ascertaining means in turn include some means for analyzing the at least one entire row substantially as a unit—i. e., not merely taking into account the effects of portions of rows at any given time.

In addition the apparatus includes some means, responsive to the analyzing-and-assessing means, for then removing chromatic-colorant data from the particular region. Further included are some means for applying the data array, after removal of chromatic-colorant data from the region, to control printing of the image by a color printer.

This fifth aspect of the invention is particularly beneficial in that it can be used to deter stripping color out of a thin vertical line which actually should be printed in color. The other threshold tests described above, if not guarded by this fifth aspect of the invention, may in some cases display a weakness of removing such color features that should not be removed.

Preferably, however, this fifth facet of the invention is practiced with additional characteristics that optimize results. In particular it is preferred that the analyzing-and-assessing means comprise some means for counting a number of consecutive regions, vertically above the particular region, from which chromatic-colorant data have been removed. The responsive means then refrain from removing chromatic-colorant data from the particular region if the number of consecutive regions exceeds the fourth specific threshold.

The number of consecutive regions is a measure of the amount of chromatic-colorant data in the vertical column. The assessing means operate to limit the effect of the determining, ascertaining and testing means, to deter chromatic-colorant removal under circumstances mentioned just above.

For this aspect of the invention the applicable threshold is, considered with respect to all color planes, a number of regions corresponding to a printed column of the image between roughly $\frac{1}{64}$ mm ($\frac{1}{1600}$ inch) and $\frac{1}{6}$ mm ($\frac{1}{16}$ inch) inclusive, and independent of the amount of black-colorant data present. An ideal value, for a highly preferred embodiment of the invention, is three to four rows at roughly twelve pixel rows per millimeter—or about $\frac{1}{4}$ to $\frac{1}{3}$ mm ($\frac{1}{100}$ to $\frac{1}{75}$ inch).

A sixth aspect or facet of the invention is, in its preferred embodiments, a method of using a color printer to print a desired image that includes black-and-white text, by construction from individual marks formed in pixel columnand-row arrays. The method includes the step of receiving or generating a data array corresponding to a desired image.

The method also includes the step of removing all chromatic-colorant data from a particular region of the array, if specified color-data conditions for the region are satisfied. The conditions include conditions on the amount of chromatic-colorant data initially present in at least one of these portions of the data array, independent of object type within the region:

the particular region, a row immediately above the particular region, a region to one side of the particular region, and a column of regions above the particular region.

The method also includes the step of applying the data array, after removal of all chromatic-colorant data from the particular region, to control printing of the image by the color printer.

All of the foregoing operational principles and advantages of the present invention will be more fully appreciated upon consideration of the following detailed description, with reference to the appended drawings, of which:

Firmware flow of the preferred embodiment appears directly within subsection 5 of the following "DETAILED DESCRIPTION" section, and accordingly is not duplicated in the drawings.

DETAILED DESCRIPTION OF THE PREFERRED EMBODIMENTS

1. Hybrid Systems

As indicated in the preceding sections of this document, systems that attempt to strip excess color by recognition procedures—i. e., by depending upon object type to find chromatic-colorant data for removal—are inadequate in removing all such disruptive data. The resulting residual prevents the system from making good use of the very large amount of removal which does occur; thus an imperfect or incomplete result is as bad as no removal at all.

It should also be mentioned that use of the present invention alone, i. e. without a prior stripping stage, is likewise inadequate in most circumstances. The reason is that the present invention cannot discriminate between (1) those image structures which simply happen to contain an amount of color that is small, and (2) those that indeed contain fringe-derived excess color within black-and-white text or the like.

Therefore if the first three chromatic-color-removal thresholds are set high, the system will not scour out all the excess color. If they are set high, however, it will remove color from truly colored parts of at least some images.

I conclude that the ideal is a hybrid system—one which sets out to perform the overall task in two distinct major steps. Of these, a first procedure can only recognize black-and-white matter, and remove the great bulk (e. a., 95% to 99%) of associated excess color; and a second can only recognize areas having very small amounts of chromatic-colorant data, and remove those very small amounts.

As an example, the present invention may be implemented in firmware—e. a., in a procedure with instructions stored in a read-only memory—as follow-on to preliminary text recognition and enhancement operating in hardware; or both may be implemented together in firmware, or both in hardware. Analogously the earlier module of the two, or both, may be implemented in software, i. e. in printer driver operating in a personal computer.

2. Additional Orientation

A preferred embodiment of the invention uses a dot counter to collect density information about each scan line being copied. This information is further subcategorized by cells or what may be called "words" across each line of the image.

For every such "word" copied from the scanner into the printing mechanism, the apparatus uses an algorithm to determine whether or not to strip color data from that "word" or leave it in. This decision is made by comparing the number of chromatic-color dots in the current word with the number of color dots seen in previous words or lines, or both.

The object is to remove extremely low densities of chromatic-colorant data. The invention preferably operates on an absolute amount of chromatic-color data, not on the amount relative to black-colorant data; in other words preferably the system does not compute a percentage of chromatic-colorant data relative to black-colorant data.

No particular defect in printed results would arise from doing so. The only drawback in such a comparative approach would be wasted time, since the key element is simply that the levels of chromatic-colorant data are extremely low.

In preferred embodiments of the invention, the scanner data or other data to be printed are generated in subtractive-primary color space, ordinarily cyan, magenta, and yellow, plus black ("CMYK"). As will be understood, the invention is entirely amenable to operation in other colorant spaces. The invention preferably not only collects no statistics on the black-colorant data, but also does not influence those data in any way.

The invention preferably collects statistics on the other color planes and then plane by plane, cell by cell, decides whether to copy these data verbatim or remove them entirely. As the decision is made for each cell of each row in each plane, data can be copied for one cell and stripped for the next.

Figure 1:
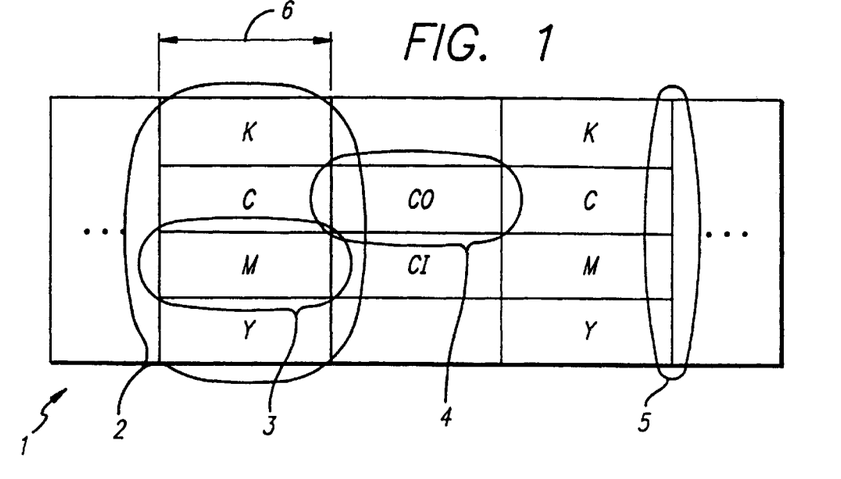
FIG. 1 is a highly schematic representation of the colorimetric structure of a pixel-grid row in a preferred embodiment of the invention.

FIG. 1 defines a preferred calorimetric architecture for the invention, and will be discussed shortly. The preferred system most typically acquires data from a scanner stage or separate scanner 11 (FIG. 2), temporarily holds the data in a buffer 12 and in due course hands them on to image-processing hardware 13.

Figures 2, 2A:
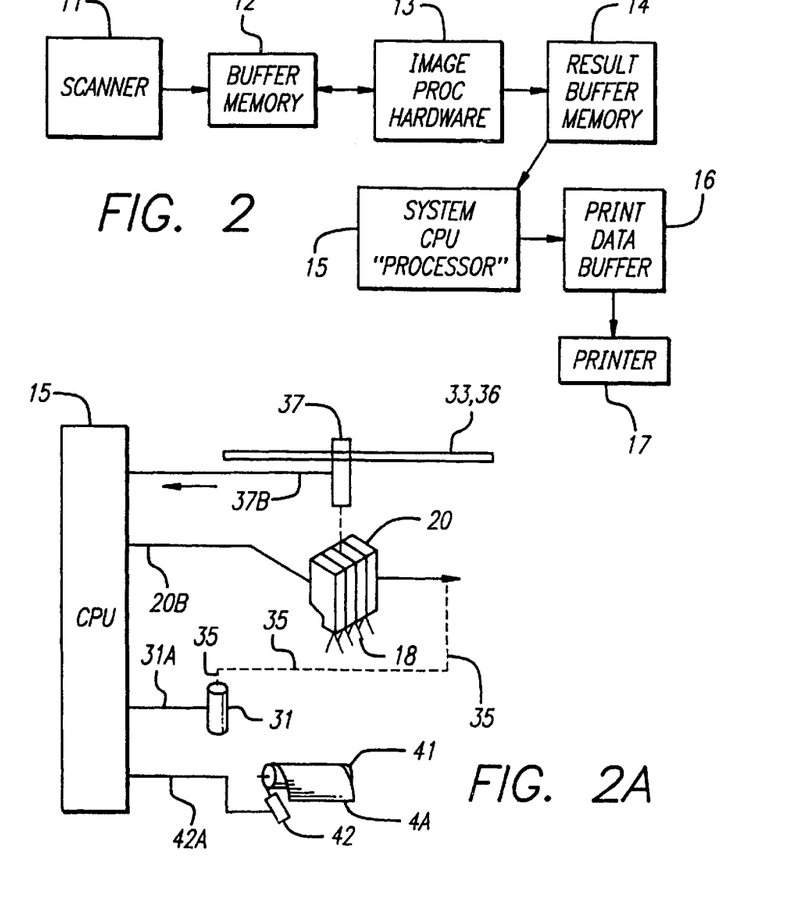
FIG. 2 is a block-diagrammatic representation of a hardware system according to the FIG. 1 embodiment.

From the DRAM or other result buffer 14, the preprocessed data proceed to the system processor 15—in which reside the hardware/software modules for performing, among many other tasks of course, the procedures of the present invention. The resulting data are then passed by way of a print-data buffer 16 to the printheads 17.

Figure 3:
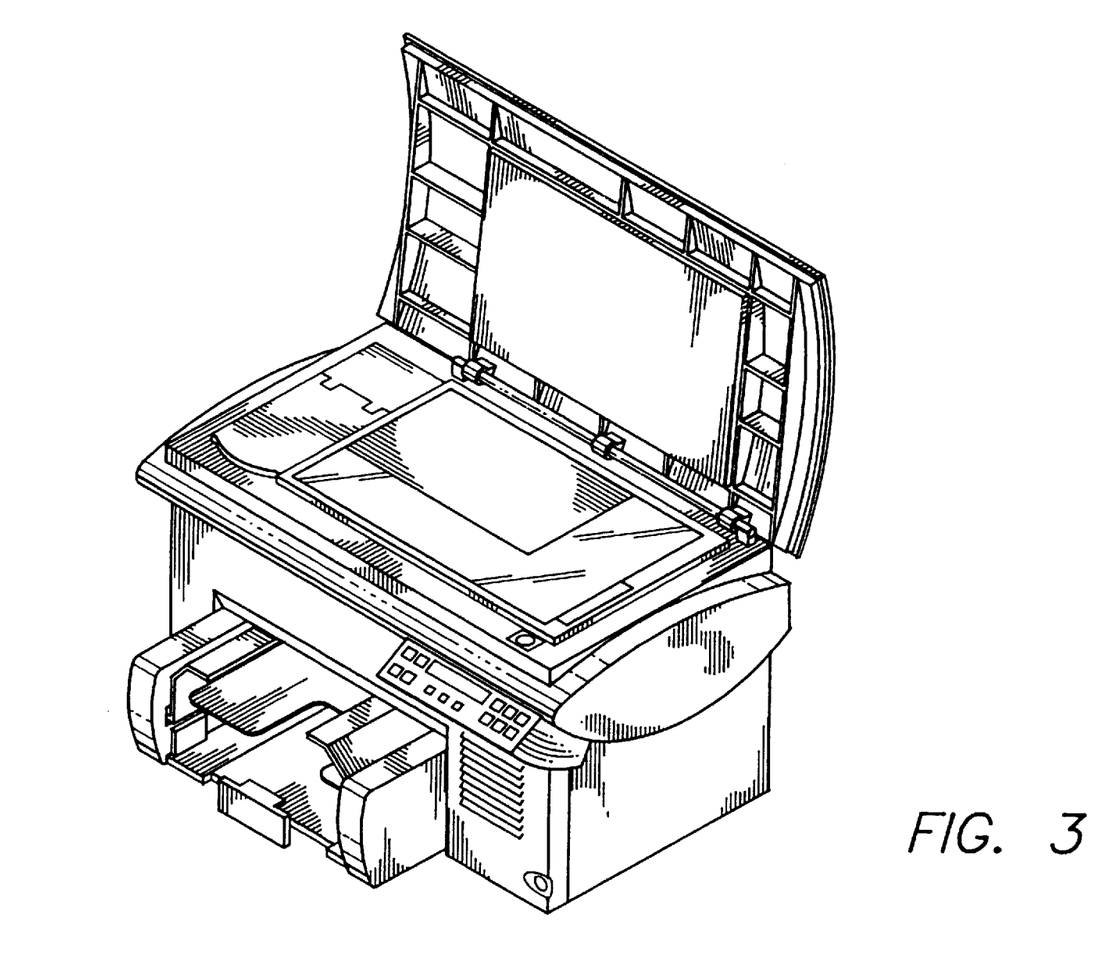
FIG. 3 is an isometric or perspective view of the exterior of a product according to the same embodiment.

As may be inferred from FIG. 3, the preferred embodiment preferably is able to function as a copying machine. It also can be used as a printer or scanner. It includes at the top a copy glass and cover, then a control console, and at bottom left a pair of trays for supplying printing-medium and receiving the finished copies or printouts.

3. Decisional Rules

All of the following tests relate to modules, not individual pixels. Monitoring individual pixels would be overly time consuming; and most systems—like that of a preferred embodiment of my invention—are capable of reading a relatively large number of pixels in a single so-called "burst".

In the preferred embodiment the number that can be so read is one hundred twenty-eight. For simple efficiencies my invention therefore when operated as that embodiment preferably employs 128-pixel cells.

(a) Previous row—Data are not stripped if the total number of color dots from the entire previous pixel-grid row exceeds a first threshold. (This corresponds to the third aspect of the invention as described earlier.) For purposes of this rule, and the next rule stated just below, in the preferred embodiment of the invention the term "dot" means a single "on" data bit in any color plane.

A secondary-colorant mark (e. a., blue in a CMYK system) can be considered as two dots—for the example of blue, one cyan and one magenta. Some high-fidelity printing systems employ two different tones of some primaries, as for example two each of cyan and magenta in a $C_1C_2M_1M_2YK$ system.

Such an arrangement in fact is used in the preferred embodiment of the invention: each row 1 (FIG. 1) has several planes 2 as for instance K, C—split into C0 and C1 (shown at point 4 in the drawing)—and M and Y.

The C1 plane 4 is the more-significant plane of the cyan primary. The magenta plane M may be similarly subdivided, as in fact may be the black plane K, but yellow is normally deemed insufficiently dark to divide.

The eight (or four) bits 5 which line up vertically in a cell define the color (including black) mark for a single pixel. The row 1 is also seen to be subdivided horizontally, into a multiplicity of cells 6 of 128-pixel length.

Other systems, typically denominated "multilevel" systems, employ plural bits for each primary. Irrespective of how the dots arise, the number of "on" bits is what is counted. The associated thresholds, however, must take into account all such variations in system colorimetric architecture.

In terms of FIG. 1, what the invention does is search for cells 2 having within them—or within a nearby entire row, or an adjacent cell, as explained herein—no more than very small quantities of the chromatic-colorant data C, M, and Y, or more precisely C0, C1, M, and Y. When such cells 2 are found, and provided that the condition on length of an above column of stripped cells is satisfied, the values of C0, C1, M and Y in all pixels of the cell are set to zero, or in other words the very small quantities are stripped or scoured out of the overall data—leaving only data in the black or K plane.

(b) Adjacent cell—Also, data are not stripped if the number of color dots from a previous cell exceeds a second threshold value. (This corresponds to the fourth aspect of the invention as described earlier.)

By the term "adjacent" or "previous" I mean to encompass previously processed cells that are immediately adjacent in a particular direction. This test can be practiced using adjacency in a horizontal or diagonal direction. It is my preference to use adjacency in a vertical direction.

(c) Current cell—Furthermore, chromatic-colorant data are not stripped if the number of "on" bits of the current primary in the current cell exceeds a third threshold. (This corresponds to the second aspect of the invention as described earlier.)

Thus the philosophy operating in this and the preceding two rules is that enunciated in most earlier sections of this document, namely that chromatic-colorant data found to occur in very small quantities should be removed.

(d) Column of cells above the current cell—If the above three rules are satisfied, then chromatic-colorant data are stripped from the current primary of the current cell unless the number of cells in a continuous uninterrupted column above the current cell have been stripped. (This corresponds to the fifth aspect of the invention as described earlier.)

In other words, if the system detects this particular geometrical relationship with a relatively large number of previously stripped cells, the system is instructed to conclude that it may be pursuing an incorrect course of action. This rule may seem to be counter to the philosophy operating in the previous three, and in fact it is precisely so.

The philosophy operating here results from an empirical observation. Without such guarding, the invention occasionally removes chromatic color from an extended vertical feature—i. e., a colored vertical line—that is not merely fringing but actually a part of the image.

Accordingly, once this rule is triggered for a specific column, it is not reset or cleared for that particular column until the system reaches a row entirely devoid of chromatic-colorant data. Such a row is considered to interrupt the assumption that possibly what is being encountered is a colored continuous vertical feature of the image. For other columns, in which the rule is not triggered, normal operation controlled by the other rules continues.

4. Preferred Thresholds

For each of the foregoing rules there is a corresponding threshold, and a set of associated considerations which are outlined below.

(a) Previous row—As mentioned earlier, my invention will operate ideally if this threshold is set at or just below 0.1% of the row size, per row. Marginally acceptable results, however, can be produced with the threshold set as low as one mark per row or as high as roughly three percent of the row size per row.

The lower bound of one mark per pixel-grid row makes sense for certain real applications to which the present invention can be applied. For example, a scanner designed to scan 7½-by-12½-cm (three-by-five-inch) notecards at about 6 pixels/mm (150 dpi) for archival purposes could have as few as 75 mm·6 pixels/mm·3 primaries=1350 bits of color information per row. One mark out of this 1350 represents 0.074% or just slightly less than the ideal value; based on extensive experimental observation, however, I believe that significantly lower settings would be ineffective in removing any significant amount of color data.

A setting above three percent of the row size per row would probably remove more color than desired. On the other hand, using a setting of three percent is just barely within the usable range.

Specifying the upper usable bound of this threshold as a percentage per number of rows used is reasonable for two reasons. First, color fringe effects due to scanning are visible only in the scanning axis—which for most scanners is the longitudinal advance direction. (For a swath scanner, however, a better rule may be expected to result from reference to columns rather than rows.)

Second, object size and resolution are strongly related to the number of rows needed to use this invention in an effective manner. Thus to process images at ultrahigh resolution, e. g., 50 pixels/mm, or to process very large objects such as large point sizes of text, probably more rows of history would be required to make an adequate determination for color-removal purposes.

(b) Adjacent cell—An ideal setting for the preferred embodiment is roughly 1.6% of the region size. Marginally useful results can be obtained at extreme settings as small as one mark and as large as about half of the region size.

A low setting of zero mark does not make sense (the rule is never enforced). A setting as low as one mark makes sense in low-resolution devices.

For example a 5 pixel/mm (125 dpi) color facsimile machine may use an adjacent region or cell defined by two 32-bit words of data. One bit in such a case represents approximately 1.6% of the area of the region, or equivalently an area of approximately $\frac{1}{25}$ mm$^2$ ($6.4 \cdot 10^{-5}$ square inches).

Settings as high as 50% can be useful. A setting above this is likely to be destructive to images containing true color. Actually even settings up to 100% can be useful, but only when relying additionally upon the other rules to limit the number of cells which are stripped.

(c) Current cell—An ideal value in a preferred embodiment of the invention is roughly 40%, or just below. Values delimiting the range of useful performance are in the neighborhood of four and fifty percent of the region size.

Settings as low as four percent will have noticeable effect in removing color content from an image, and have been considered for use in products. A setting of about 4½% has been tested, and found less effective than desired. Again in view of considerable empirical observation I believe that settings below four percent are likely to be ineffective at any resolution, character size, or scan technology.

The fifty-percent upper bound for a reasonable, effective setting makes sense for the same reasons suggested above for the adjacent-cell threshold. Again here, assuming for purposes of discussion that it might be desirable to use the current-cell threshold—and the means for removing color data to which it relates—independently of any other means of removing color information, settings higher than fifty percent become excessive and can cause undue destruction to actual color regions of the image.

(d) Column of cells above—For a preferred embodiment using pixel-row spacing of about $\frac{1}{12}$ mm ($\frac{1}{300}$ inch), this threshold can be set in a range between roughly $\frac{1}{64}$ and $\frac{1}{6}$ mm ($\frac{1}{1600}$ and $\frac{1}{16}$ inch), inclusive. The usable threshold range in terms of number of regions is best related to this absolute distance range.

The lower bound of $\frac{1}{64}$ mm is sufficient to cover foreseeable advances in the technology to which this invention may be applied. The upper bound of $\frac{1}{6}$ mm is sufficiently large to allow as much removal of color data as possible without producing visible defects in the printed result—i. e., allowing visible color regions from the image source to be discarded.

5. Algorithm

The index i=cell number.

A. numcells=(pixels in a row)/cellsize; and
   cellsize=128 preferably, the optimal access of one processor burst
   (Thus "numcells" is the number of reads done across a page from left to right, for each primary. Each "read" reads 128 pixels, which could be 128 wide by 1-bit binary data or 64 wide by 2-bit "hi-fipe" high-fidelity data. Because there are three primaries, each cell requires three reads to obtain the whole image.)

B. For all i from 0 to numcells, initialize:
   current$_i$=0 (current-cell dot count)
   runlength$_i$=0 (length of uninterrupted vertical column of stripped cells)
   stripped$_i$=0 (current cell stripped?)

C. For r from 0 to number of rows per page,
   1. For all i from 0 to numcells,
      prev$_i$=currenti (save current number of color bits for reference as "adjacent cell")
      if stripped$_i$==1, then rowlength$_i$+=1 (increment "runlength"—uninterrupted vertical column length)
      stripped$_i$=0 (reset "stripped for next cell)
   2. previous=sum prev$_i$ from i=0 to numcells (figuring last row)
   3. If previous==0 then
      for all I from 0 to numcells, runlength$_i$=0 (overrides runlength if no color is in whole previous row)
   4. For plane=cyan, magenta, yellow
      for i=0 to numcells
      i. Read data from scanner for this cell and this plane, keeping track of how many pixels (out of a possible 128, or fewer for last cell on "right" of page) are set to 1. Call this number "dots".
      (At 12 pixels/mm and 125 mm, the row is 1500 pixels long, and 1500/128=11 remainder 92. Therefore numcells=11, but counting from zero this comes to twelve cells. The last cell is only 92 pixels wide.)
      ii. current$_i$+=dots (increment "current cell")
      iii. If all of the following conditions are true:
         previous$_{all\ planes}$≦thresh1 (row above)
         prev$_i$≦thresh2 (adjacent cell)
         dots$_{one\ plane}$≦thresh3 (current cell, and for practicality evaluating in just one plane)
         runlength$_i$≦thresh4 (vertical column)
         1) Then copy zeroes to the printer data buffer for this cell and plane,
         2) set stripped$_i$=1;
         otherwise copy the scanner data to the printer data buffer for this cell and plane.

The above disclosure is intended as merely exemplary, and not to limit the scope of the invention—which is to be determined by reference to the appended claims.

What is claimed is:

1. Color printing apparatus for printing a desired image that includes black-and-white text, by construction from individual marks formed in pixel column-and-row arrays, based on a desired-image data array from which most chromatic-colorant data in text areas have already been stripped; said apparatus comprising:
   means for receiving the data array;
   means for removing all chromatic-colorant data from a particular region of the array, if specified color-data conditions for the particular region are satisfied, independent of object type within the region; and
   means for applying the data array, after removal of all chromatic-colorant data from the particular region, to control printing of the image by a color printer.

2. The apparatus of claim 1, further comprising:
   means for storage, and automatic retrieval therefrom, of instructions for automatic operation of the receiving, removing and applying means.

3. The apparatus of claim 1, wherein the removing means comprise:
   means for determining whether the amount of chromatic-colorant data in the particular region is less than a specific threshold; and
   means, responsive to said determining means, for then removing chromatic-colorant data from the particular region.

4. The apparatus of claim 3, wherein:
   the removing means further comprise means for ascertaining whether the amount of chromatic-colorant data in an entire row immediately above the particular region is less than a second specific threshold; and the responsive means are also responsive to said ascertaining means.

5. The apparatus of claim 4, wherein:

the removing means further comprise means for testing whether the amount of chromatic-colorant data in a region adjacent to the particular region is less than a third specific threshold; and the responsive means are also responsive to said testing means.

6. The apparatus of claim 5, wherein the adjacent region is:

immediately above the particular region; and generally the same width as the particular region.

7. The apparatus of claim 5, wherein:

the removing means further comprise means for assessing whether the amount of chromatic-colorant data in a vertical column above the particular region exceeds a fourth specific threshold; and the responsive means are also responsive to said assessing means.

8. The apparatus of claim 7, wherein:

the assessing means comprise means for counting a number of consecutive regions, vertically above said particular region, from which chromatic-colorant data have been removed; and the responsive means refrain from removing chromatic-colorant data from the particular region if the number of consecutive regions exceeds the fourth specific threshold;

wherein said number of consecutive regions is a measure of said amount of chromatic-colorant data in the vertical column; and whereby the assessing means operate to limit the effect of the determining, ascertaining and testing means, to deter chromatic-colorant removal from a substantially continuous thin vertical chromatic-color line.

9. The apparatus of claim 8, wherein:

the threshold is, considered with respect to all color planes, a number of regions corresponding to a printed column of the image between about $\frac{1}{64}$ mm ($\frac{1}{1600}$ inch) and $\frac{1}{6}$ mm ($\frac{1}{16}$ inch) inclusive, and independent of the amount of black-colorant data present.

10. The apparatus of claim 1, wherein:

the applying means comprise means for controlling the color printer to print said particular region using only a black pen.

11. The apparatus of claim 1, wherein:

the applying means comprise means for controlling the color printer to print said particular region using a single-pass printmode.

12. Color printing apparatus for printing a desired image that includes black-and-white text, by construction from individual marks formed in pixel columnand-row arrays; said apparatus comprising:

means for receiving or generating a data array corresponding to a desired image;

automatic means for analyzing the image data by subdividing the image data into regions and determining whether chromatic-colorant data, independent of object type, in a particular region is less than a specific threshold;

means, responsive to said analyzing-and-determining means, for then removing chromatic-colorant data from the particular region; and means for applying the data array, after removal of chromatic-colorant data from said region, to control printing of the image by a color printer.

13. The apparatus of claim 12, wherein:

said threshold is a total, evaluating each color plane independently, of between about four percent and fifty percent, inclusive, of the region size, independent of the amount of black-colorant data present.

14. Color printing apparatus for printing a desired image that includes black-and-white text, by construction from individual marks formed in pixel columnand-row arrays; said apparatus comprising:

means for receiving or generating a data array corresponding to a desired image;

automatic means for analyzing the image data by subdividing the image data into regions and ascertaining whether chromatic-colorant data, independent of object type, in at least one entire row immediately above a particular region is less than a specific threshold; said analyzing-and-ascertaining means comprising means for analyzing said at least one entire row substantially as a unit;

means, responsive to said analyzing-and-ascertaining means, for then removing chromatic-colorant data from the particular region; and means for applying the data array, after removal of chromatic-colorant data from said region, to control printing of the image by a color printer.

15. Color printing apparatus for printing a desired image that includes black-and-white text, by construction from individual marks formed in pixel column-and-row arrays; said apparatus comprising:

means for receiving or generating a data array corresponding to a desired image;

automatic means for analyzing the image data by subdividing the image data into regions and assessing whether chromatic-colorant data in a column of regions vertically above a particular region is less than a specific threshold;

means, responsive to said analyzing-and-assessing means, for then removing chromatic-colorant data from the particular region; and means for applying the data array, after removal of chromatic-colorant data from said region, to control printing of the image by a color printer.

16. The apparatus of claim 15, wherein:

the assessing means comprise means for counting a number of consecutive regions, vertically above said particular region, from which chromatic-colorant data have been removed; and the responsive means refrain from removing chromatic-colorant data from the particular region if the number of consecutive regions exceeds the fourth specific threshold;

wherein said number of consecutive regions is a measure of said amount of chromatic-colorant data in the vertical column; and whereby the assessing means operate to limit the effect of the determining, ascertaining and testing means, to deter chromatic-colorant removal from a substantially continuous thin vertical chromatic-color line.

17. The apparatus of claim 16, wherein:

the threshold is, considered with respect to all color planes, a number of regions corresponding to a printed column of the image between roughly $\frac{1}{64}$ mm ($\frac{1}{1600}$ inch) and 1/6 mm (1/16 inch) inclusive, and independent of the amount of black-colorant data present.

18. A method of using a color printer to print a desired image that includes black-and-white text, by construction from individual marks formed in pixel column-and-row arrays; said method comprising the steps of:

receiving or generating a data array corresponding to a desired image;

removing all chromatic-colorant data from a particular region of the array, if specified color-data conditions for the particular region are satisfied, said conditions comprising conditions on chromatic-colorant data initially present in at least one portion of the data array, independent of object type within the region:
the particular region,
a row immediately above the particular region,
a region to one side of the particular region,
a column of regions above the particular region; and applying the data array, after removal of all chromatic-colorant data from the particular region, to control printing of the image by the color printer.

19. A color copier particularly for use in rapidly reproducing black text near graphical image elements of an original document, and also in reproducing black text near pictorial image elements of an original document, through use of a reproduction technology that prints black elements in chromatic-color-containing image regions much more slowly than black elements elsewhere; said copier comprising:

a scanner stage for collecting optical information from the original document and generating in response thereto a corresponding image-data array;

a preliminary recognition-and-stripping stage for recognizing an image-data array region containing black text and stripping almost all, but not all, chromatic-color data from the region;

wherein the region, with remaining chromatic-color data from the preliminary stage, is ready to be printed slowly by said reproduction technology;

a secondary stripping stage, substantially distinct from the preliminary stage, for removing all remaining chromatic-color data from the region if specified color-data conditions for the particular region are satisfied, independent of object type within the region;

wherein the region, with all chromatic-color data removed by the secondary stage, is ready to be printed quickly by said reproduction technology; and means for applying the data array, after removal of all chromatic-colorant data from the region, to control printing of the image by said reproduction technology.

20. The copier of claim 19, wherein:

in data leaving the preliminary stage, the region with remaining chromatic-color data is ready to be printed without substantially noticeable color fringing.

21. The copier of claim 20, wherein:

in data leaving the preliminary stage, the region with remaining chromatic-color data from is ready to be printed without use of dot depletion to correct excess inking.

22. The copier of claim 20, wherein:

said reproduction technology prints black within color regions more slowly than elsewhere because said technology is a wet-colorant swath process, not a xerographic drum process;

the secondary stripping stage operates substantially without iteration as the removing step; and the image-data array is not a designed graphics file.

* * * * *